US012650300B2

(12) United States Patent　　　　(10) Patent No.:　　US 12,650,300 B2
Cardoso　　　　　　　　　　　　　(45) Date of Patent:　　　*Jun. 9, 2026

(54) SYSTEM AND METHOD TO AUTOMATICALLY COUNT COMPONENTS EMBEDDED OR COUPLED WITH ASSEMBLY AND STORAGE EQUIPMENT

(71) Applicant: Creative Electron, Inc., San Marcos, CA (US)

(72) Inventor: Guilherme Cardoso, Temcula, CA (US)

(73) Assignee: Creative Electron Inc., San Marcos, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/236,535

(22) Filed: Aug. 22, 2023

(65) Prior Publication Data

US 2023/0394656 A1　　Dec. 7, 2023

Related U.S. Application Data

(63) Continuation of application No. 17/838,272, filed on Jun. 13, 2022, now Pat. No. 11,734,821, which is a continuation of application No. 16/698,174, filed on Nov. 27, 2019, now Pat. No. 11,386,554.

(60) Provisional application No. 62/775,364, filed on Dec. 4, 2018, provisional application No. 62/772,034, filed on Nov. 27, 2018.

(51) Int. Cl.
　　*G01B 15/02*　　　(2006.01)
　　*G06F 1/16*　　　(2006.01)
　　*G06T 7/00*　　　(2017.01)
　　*G06T 7/60*　　　(2017.01)

(52) U.S. Cl.
　　CPC ............. *G01B 15/025* (2013.01); *G06F 1/16* (2013.01); *G06T 7/0004* (2013.01); *G06T 7/0012* (2013.01); *G06T 7/60* (2013.01); *G06T 2207/10116* (2013.01)

(58) Field of Classification Search
　　CPC ................... G06T 7/0012; G06T 2207/10116; G06F 1/16
　　See application file for complete search history.

(56) References Cited

U.S. PATENT DOCUMENTS

2001/0040117 A1*　11/2001　Easton ................. H05K 13/084
　　　　　　　　　　　　　　　　　　206/713
2016/0169818 A1*　6/2016　Martin ................. G01N 23/223
　　　　　　　　　　　　　　　　　　702/81

FOREIGN PATENT DOCUMENTS

WO　　WO-2015170791 A1 *　11/2015　............. B65H 67/00

* cited by examiner

*Primary Examiner* — Andrew W Bee
*Assistant Examiner* — Winta Gebreslassie
(74) *Attorney, Agent, or Firm* — Charmasson, Buchaca & Leach, LLP

(57)　　　　　　　ABSTRACT

An automatic parts counter with an x-ray imaging system to image parts disposed in at least one of a component reel, component trays, cut tape; an image processing algorithm to count the image parts; and a docking interface for docking to a storage unit.

5 Claims, 2 Drawing Sheets

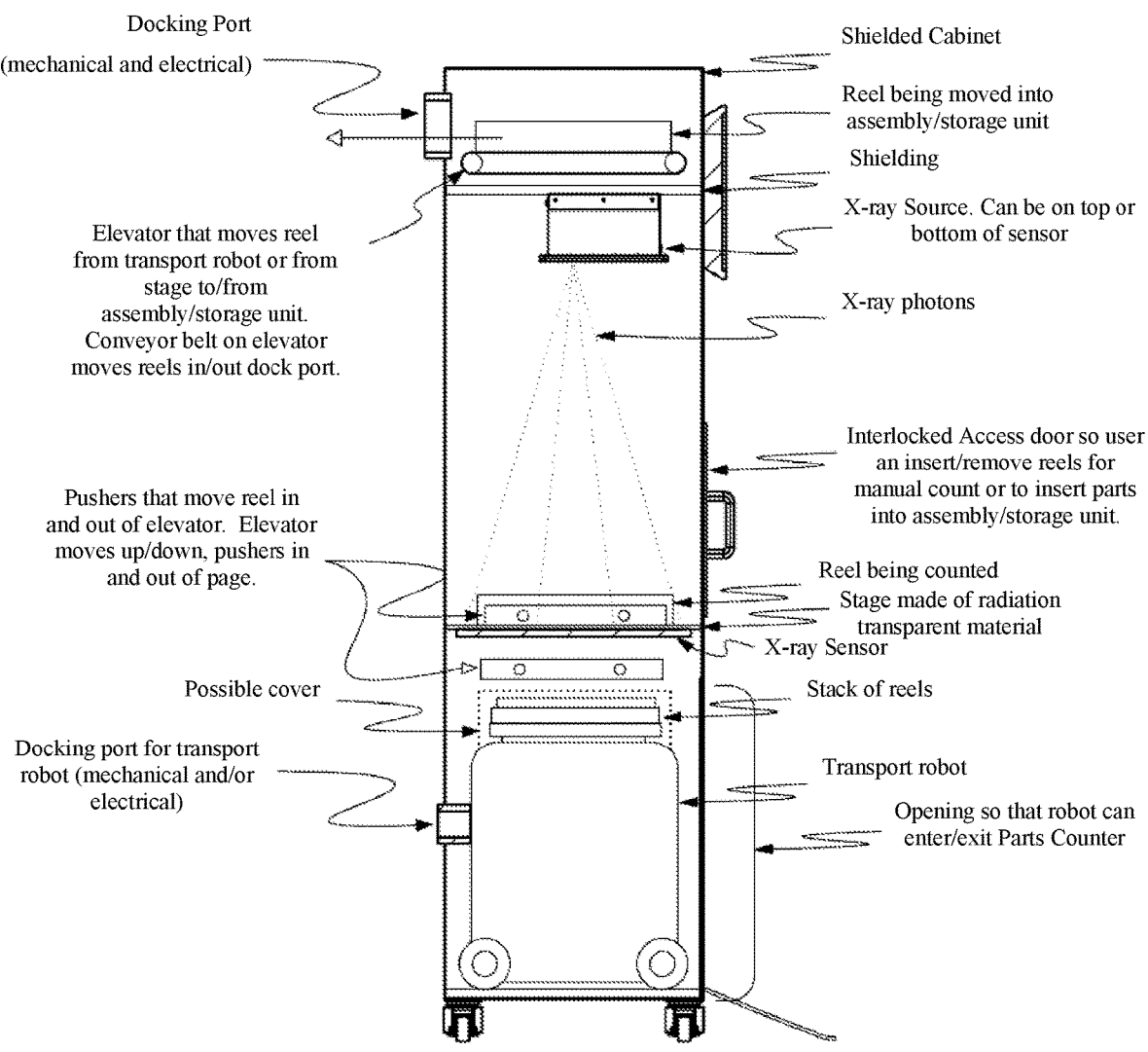

Docking Port
(mechanical and electrical)

Elevator that moves reel
from transport robot or from
stage to/from
assembly/storage unit.
Conveyor belt on elevator
moves reels in/out dock port.

Pushers that move reel in
and out of elevator. Elevator
moves up/down, pushers in
and out of page.

Possible cover

Docking port for transport
robot (mechanical and/or
electrical)

Shielded Cabinet

Reel being moved into
assembly/storage unit

Shielding

X-ray Source. Can be on top or
bottom of sensor

X-ray photons

Interlocked Access door so user
an insert/remove reels for
manual count or to insert parts
into assembly/storage unit.

Reel being counted

Stage made of radiation
transparent material

X-ray Sensor

Stack of reels

Transport robot

Opening so that robot can
enter/exit Parts Counter

Fig. 1

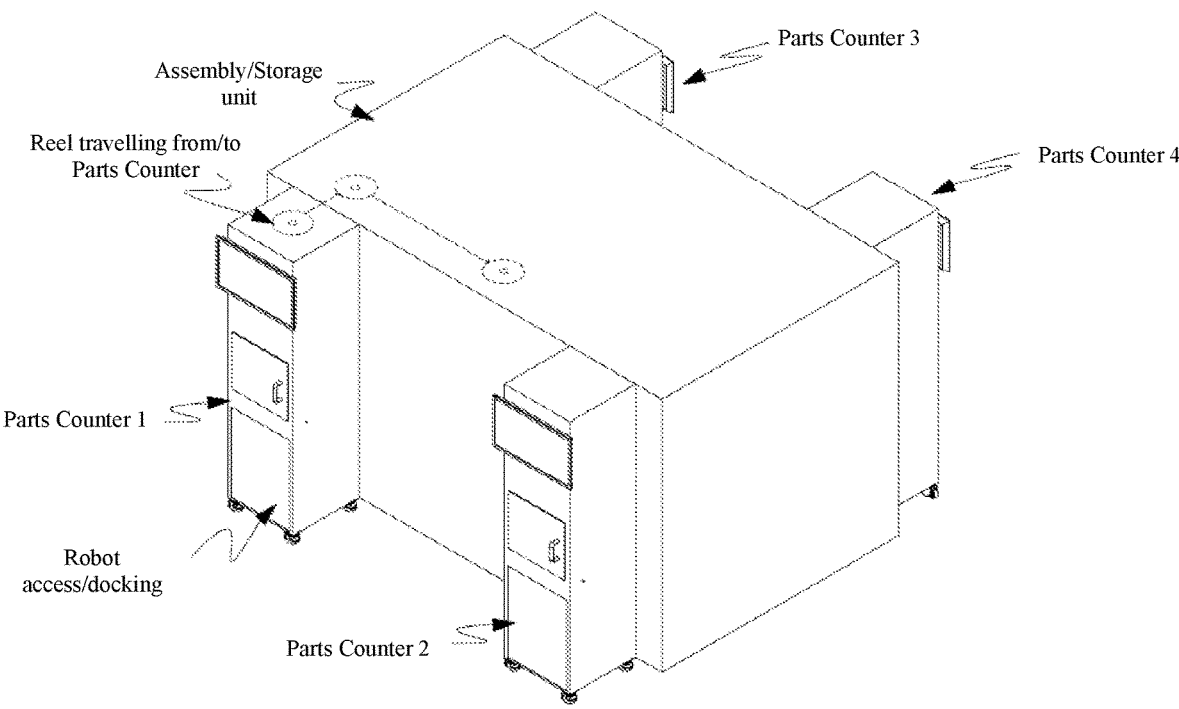

Parts Counter 3

Assembly/Storage unit

Reel travelling from/to Parts Counter

Parts Counter 4

Parts Counter 1

Robot access/docking

Parts Counter 2

Docked Parts Counter

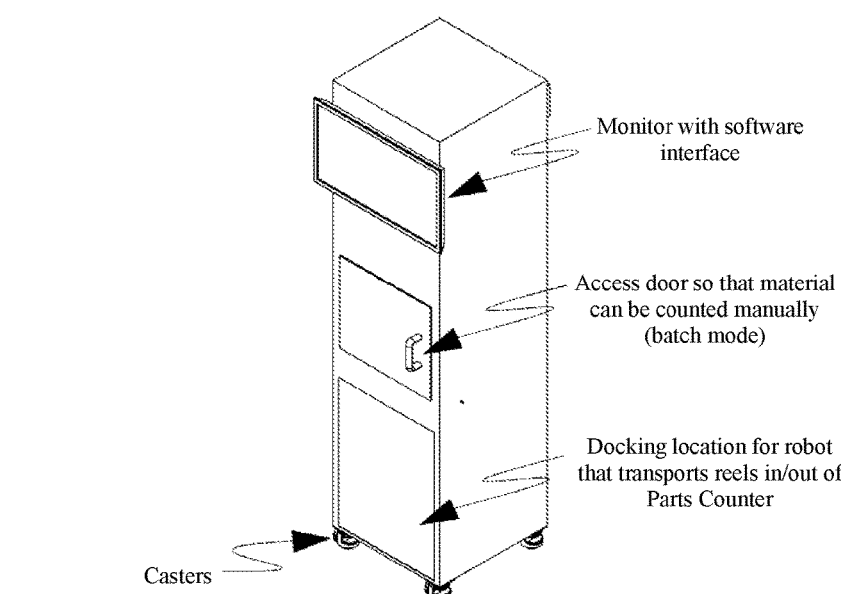

Monitor with software interface

Access door so that material can be counted manually (batch mode)

Docking location for robot that transports reels in/out of Parts Counter

Casters

Undocked Parts Counter

Fig. 2

SYSTEM AND METHOD TO AUTOMATICALLY COUNT COMPONENTS EMBEDDED OR COUPLED WITH ASSEMBLY AND STORAGE EQUIPMENT

PRIOR APPLICATION

This is a continuation of U.S. patent application Ser. No. 17/838,272, filed 2022 Jun. 13, which is a continuation of U.S. patent application Ser. No. 16/698,174, filed 2019 Nov. 27, now U.S. Pat. No. 11,386,554, which claims the benefit of U.S. Provisional Application No. 62/772,034, filed 2018 Nov. 27, all of which are incorporated herein by reference in their entireties.

FIELD

This invention relates to systems and methods for the integration of an inventory system that contains the storage portion connected to the counting portion. More particularly, examples are related to an x-ray based "reel" system for automatic component and/or part counting using advanced algorithms for distinguishing elements, and (optionally) docked storage unit(s).

BACKGROUND

Component identification and counting for, example, "reel" or other mass stored components can be difficult to determine if the reels contain more than one type of component. Additionally, the stored form factor may not lend itself for easy identification via optical techniques (for example, a protective covering may obscure viewing and inspection). Further, typical approaches to managing the occurrence of a different component in a counting scheme is to first manually recognize there is a different component, then manually or semi-manually identify it, then manually or semi-manually count its number and proceed until the next occurrence of a different component. Of course, this approach is manually intensive and prone to error. For high speed counting, single reel approaches are time-consuming and an automated reel-storage/retrieval system would increase throughput.

Therefore, there has been a long-standing need in the community for more automated and "intelligent" approaches for achieving one or more of the above objectives. Including, least of all the rapid identification of a different component and rapid counting and storage/reel exchange. The following description provides several methods and systems for addressing these and other shortcomings in the industry.

SUMMARY

The following presents a simplified summary in order to provide a basic understanding of some aspects of the claimed subject matter. This summary is not an extensive overview and is not intended to identify key/critical elements or to delineate the scope of the claimed subject matter. Its purpose is to present some concepts in a simplified form as a prelude to the more detailed description that is presented later.

In one aspect of the disclosed embodiments, an automatic parts counter is provided, comprising: an x-ray imaging system to image parts disposed in at least one of a component reel, component trays, cut tape; an image processing algorithm to count the image parts; and a docking interface for docking to a storage unit.

In another aspect of the disclosed embodiments, the parts counter described above further comprises a storage unit docket to the parts counter; and/or wherein reels transferred between the part counter and the storage unit are transferred via at least one of a conveyer and a robot.

BRIEF DESCRIPTION OF THE DRAWINGS

FIG. 1 is a sketch of an internal arrangement for a parts counter embodiment.

FIG. 2 is contains two illustrations, the first of a docked parts counter embodiment, the second of a un-docked embodiment.

DETAILED DESCRIPTION

This application covers the integration of an inventory system that contains the storage portion connected to the counting portion. The methods of storage of parts or units include shelves, buckets, boxes. Parts can be stored by unit or by packet. The methods to count parts include all methods that allow a computer to count how many parts are present in inventory. The physical medium used to collect the information include laser, optical (visual light spectrum), infrared, x-ray, gamma ray, and others. These sensors allow a counting algorithm to determine the number of physical parts in the inventory.

The parts counter and storage systems are integrated. This integration can be permanent, in the case the parts counter cannot be removed from the storage system. This integration can be temporary, in the case the parts counter and storage system can be separated. When separated, the parts counter and storage system can or cannot be used separately.

The new Parts Counter we developed uses x-ray imaging techniques to image the parts and counts them by using image processing algorithms. The next evolution of this product line is to create a modular x-ray Parts Counter that can be used in standalone mode or docked/embedded assembly machines or component storage systems.

When we say "reel", it also applies to component trays, cut tape, and any other type of component packaging.

In a modular configuration, the Parts Counter can be docked to the storage/assembly unit. Component reels from the storage/assembly unit are delivered to the Parts Counter. Once the Parts Counter is done counting how many components are in the reel, the reel is returned to the storage/assembly unit. The transport between the storage/assembly unit and the Parts Counter is automated utilizing robots and/or conveyors.

Some of the Options:

Information about the reel can be sent to the Parts Counter. That information can be used to improve the accuracy of the counter's algorithm by giving the software a priori information about the component being inspected.

The results of the count can be sent back to the assembly/tower/management systems so that manufacturing management software can be updated with the new count.

The Parts Counter can have a label application device that applies a new label—with the updated count and the information from the assembly/storage and manufacturing/enterprise resource planning or equivalent database. This label can be applied to the reel before the reel is retrieved to the assembly/storage equipment.

A heating/cooling element can be added to this device to provide proper treating to the components. This treatment can be applied to the parts prior to, during, or after the counting operation. This treatment can also be applied to the parts even if no counting is performed.

The Parts Counter can have a label reader to identify the reel inserted into the machine.

The reels can also be inserted into the Parts Counter using a manual method, conveyor belt, or robot.

While docked to the assembly/storage unit, the Parts Counter can also be used in manual/batch mode. It can also be undocked for full manual/batch mode. The unit can have casters for ease of dock/undock.

The Parts Counter can have an opening on the bottom of the unit used to dock a robot carrying a stack of reels. These reels can be picked up by the robot inside the Parts Counter, presented to the x-ray sensor for imaging, them moved to the assembly/storage unit.

The docking between the parts counter and the assembly/storage unit can be done utilizing mechanical ports in the Parts Counter that align with the assembly/storage units, thus allowing the traffic of reels to flow back and forth.

If the modularity of a dockable Parts Counter is not needed, one can permanently embed the Parts Counter to the assembly/storage unit.

The Parts Counter unit can have a user interface to allow user to identify parts being counted, input parameters to the algorithm, and perform overall diagnostics inspection of the system.

The management system in the assembly/storage units can manage the Parts Counter utilization as to optimize the resources available. For example, parts can be counted overnight as the utilization of the Parts Counter is low.

The management software can also count/label/bake overnight all parts that will be needed for assemblies the following day.

FIG. 1 is an illustration of a parts counter system, utilizing an x-ray (or other EM radiation) system for counting.

FIG. 2 contains illustrations of a system with a docked storage and parts counter system, and an undocked parts counter.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An automatic parts counter, comprising:
an x-ray imaging system configured to image parts disposed in at least one of a component reel, component trays, and cut tape;
an image processing algorithm in the x-ray imaging system, the algorithm identifying a part type after being x-ray imaged as one of a plurality of different part types for x-ray imaging and configuring the x-ray imaging system to properly x-ray image subsequent parts of the identified part type and properly count the x-ray imaged parts, without requiring manual intervention by an operator;
a docking interface for docking the parts counter to a storage unit, the interface configured to channel parts in a removably docked storage unit; and,
wherein the docking interface is a plurality of docking interfaces, enabling the x-ray imaging system to x-ray image parts from a plurality of docked storage units.

2. The parts counter of claim 1, further comprising a removable storage unit docked to the parts counter.

3. The parts counter of claim 2, wherein reels transferred between the parts counter and the storage unit are transferred via at least one of a conveyer and a robot.

4. The parts counter of claim 1, the storage unit is mobile and robotically docketed to the docking interface, wherein parts in the storage unit are automatically loaded into the x-ray imaging system.

5. The parts counter of claim 1, further comprising at least one of a labeler, heating element, cooling element, label reader.

* * * * *